US008960540B2

(12) United States Patent
Smets et al.

(10) Patent No.: US 8,960,540 B2
(45) Date of Patent: Feb. 24, 2015

(54) METHODS AND SYSTEMS FOR MERCHANT SELECTION OF NETWORK ROUTING

(71) Applicant: MasterCard International Incorporated, Purchase, NY (US)

(72) Inventors: Patrik Smets, Nijlen (BE); Patrick Mestre, Namur (BE); Eddy Van de Velde, Leuven (BE)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 14/019,426

(22) Filed: Sep. 5, 2013

(65) Prior Publication Data
US 2014/0158759 A1 Jun. 12, 2014

Related U.S. Application Data

(63) Continuation of application No. 13/478,367, filed on May 23, 2012, now Pat. No. 8,544,735.

(60) Provisional application No. 61/696,922, filed on Sep. 5, 2012.

(51) Int. Cl.
*G06K 5/00* (2006.01)
*G06K 15/00* (2006.01)
*G06Q 20/20* (2012.01)
*G06Q 20/34* (2012.01)

(52) U.S. Cl.
CPC ............ *G06Q 20/208* (2013.01); *G06Q 20/354* (2013.01); *G06Q 20/3552* (2013.01); *G06Q 20/3563* (2013.01)

USPC ............ 235/380; 235/383; 235/451; 235/492

(58) Field of Classification Search
USPC ......... 235/380, 383, 449, 493, 375, 379, 451, 235/492
See application file for complete search history.

(56) References Cited

U.S. PATENT DOCUMENTS

| | | | | |
|---|---|---|---|---|
| 6,005,942 | A * | 12/1999 | Chan et al. | 713/187 |
| 6,233,683 | B1 * | 5/2001 | Chan et al. | 713/172 |
| 6,915,277 | B1 * | 7/2005 | Manchester et al. | 705/39 |
| 8,370,258 | B2 * | 2/2013 | Roberts et al. | 705/44 |
| 2001/0047330 | A1 * | 11/2001 | Gephart et al. | 705/39 |
| 2003/0204470 | A1 * | 10/2003 | Manchester et al. | 705/39 |
| 2004/0117300 | A1 * | 6/2004 | Jones et al. | 705/39 |
| 2007/0063024 | A1 * | 3/2007 | Guillot | 235/380 |
| 2011/0082792 | A1 * | 4/2011 | Ballard et al. | 705/44 |
| 2011/0106638 | A1 * | 5/2011 | Fernandez | 705/17 |
| 2011/0178925 | A1 * | 7/2011 | Lindelsee et al. | 705/44 |
| 2011/0251892 | A1 * | 10/2011 | Laracey | 705/14.51 |
| 2013/0048712 | A1 * | 2/2013 | Guillaud et al. | 235/379 |
| 2014/0025518 | A1 * | 1/2014 | Look | 705/21 |

* cited by examiner

*Primary Examiner* — Tuyen K Vo
(74) *Attorney, Agent, or Firm* — Buckley, Maschoff & Talwalkar LLC (57) ABSTRACT

A system and method for operating a payment terminal, the method including receiving a list of eligible applications from a payment device; generating a candidate list including applications from the list of eligible applications received that are supported by the payment terminal; determining a reduced candidate list, the reduced candidate list including applications from the candidate list that match merchant-specified network preference criteria; determining a final selection of an application based on the reduced candidate list; and providing an indication of the final selection application.

24 Claims, 7 Drawing Sheets

```
┌─────────────────────────────────────────────────┐
│ RECEIVE A LIST OF ELIGIBLE APPLICATIONS FROM A  │
│              PAYMENT DEVICE                     │
│                                            505  │
└─────────────────────────────────────────────────┘
                         │
                         ▼
┌─────────────────────────────────────────────────┐
│  GENERATE A CANDIDATE LIST INCLUDING APPLICATIONS│
│  FROM THE LIST OF ELIGIBLE APPLICATIONS THAT ARE │
│     SUPPORTED BY THE PAYMENT TERMINAL            │
│                                            510  │
└─────────────────────────────────────────────────┘
                         │
                         ▼
┌─────────────────────────────────────────────────┐
│  DETERMINE A REDUCED CANDIDATE LIST THAT INCLUDES│
│  APPLICATIONS FROM THE CANDIDATE LIST THAT ARE   │
│  SUBJECT TO NON-EXCLUSIVE NETWORK ROUTING CRITERIA│
│                                            515  │
└─────────────────────────────────────────────────┘
                         │
                         ▼
┌─────────────────────────────────────────────────┐
│ DETERMINE AN APPLICATION PRIORITY INDICATOR      │
│ ASSOCIATED WITH EACH APPLICATION IN THE          │
│ REDUCED CANDIDATE LIST                           │
│                                            520  │
└─────────────────────────────────────────────────┘
                         │
                         ▼
┌─────────────────────────────────────────────────┐
│ DETERMINE A FINAL SELECTION OF AN APPLICATION    │
│ BASED ON THE APPLICATION PRIORITY INDICATOR OF   │
│ THE APPLICATIONS IN THE REDUCED CANDIDATE LIST   │
│                                            525  │
└─────────────────────────────────────────────────┘
                         │
                         ▼
┌─────────────────────────────────────────────────┐
│      PROVIDE AN INDICATION OF THE FINAL          │
│           SELECTION APPLICATION                  │
│                                            530  │
└─────────────────────────────────────────────────┘
```

```
┌─────────────────────────────────────────────────┐
│   TRANSMIT INFORMATION RELATED TO A PAYMENT     │
│   DEVICE TO AN ISSUER OF THE PAYMENT DEVICE     │
│                                             805 │
└─────────────────────────────────────────────────┘
                        │
                        ▼
┌─────────────────────────────────────────────────┐
│  RECEIVE UPDATE DATA FROM THE ISSUER IN RESPONSE│
│          TO THE TRANSMITTED INFORMATION         │
│                                             810 │
└─────────────────────────────────────────────────┘
                        │
                        ▼
┌─────────────────────────────────────────────────┐
│   TRANSMIT THE UPDATE DATA TO THE PAYMENT DEVICE│
│      TO CAUSE AN UPDATING OF A PARAMETER ON     │
│                 THE PAYMENT DEVICE              │
│                                             815 │
└─────────────────────────────────────────────────┘
```

*FIG. 8*

METHODS AND SYSTEMS FOR MERCHANT SELECTION OF NETWORK ROUTING

BACKGROUND

In certain markets and situations it is possible for issuers of a payment card to associate that card with multiple Debit Payment Networks (referred to herein as "debit networks" or "payment networks"). For payment card transactions that use the data on a magnetic stripe of the card, the merchant may then choose which of those debit networks should be used to route a transaction. The payment network routing decision will be determined according to commercial preferences and/or agreements encoded in the terminal or in the acquiring network.

When the transaction is read using magnetic stripe technology, there is typically only a single set of card data on the magnetic stripe and this data is (largely) independent of the terminal and network processing down the line. However, for payment transactions performed with EMV (Europay, MasterCard and Visa) compliant chip cards and/or EMV processing flow, each payment network is typically represented by its own set of functionality and data on the card, which may be dependent on the terminal and networking processing down the line. If this is the case, then merchants need to be able to make a selection between the card functionality and data sets to determine how a transaction should be routed after a card is presented to the terminal for payment.

Currently, some merchants presented with a chip card for payment transactions are generally unable to select the right or desired set of card data to process or route the transaction based on the preference(s) of the merchants. Thus, there exists a need and desire to provide methods and systems that allow a merchant to select the appropriate set of card data to determine the desired network to process a payment card transaction.

DETAILED DESCRIPTION

Pursuant to some embodiments of the present disclosure, systems and methods for merchant selection of card data to determine desired payment network routing are provided. In some embodiments, the systems and methods disclosed herein may be used in conjunction with so-called "smart cards", integrated circuit (IC) cards, and other payment devices (such as, for example, mobile telephones, portable electronic devices running a payment or application or "app", etc.) that are compliant with the EMV standard. It is noted however, that embodiments and aspects of the present disclosure are not limited to use with the EMV standard.

Figure 1:
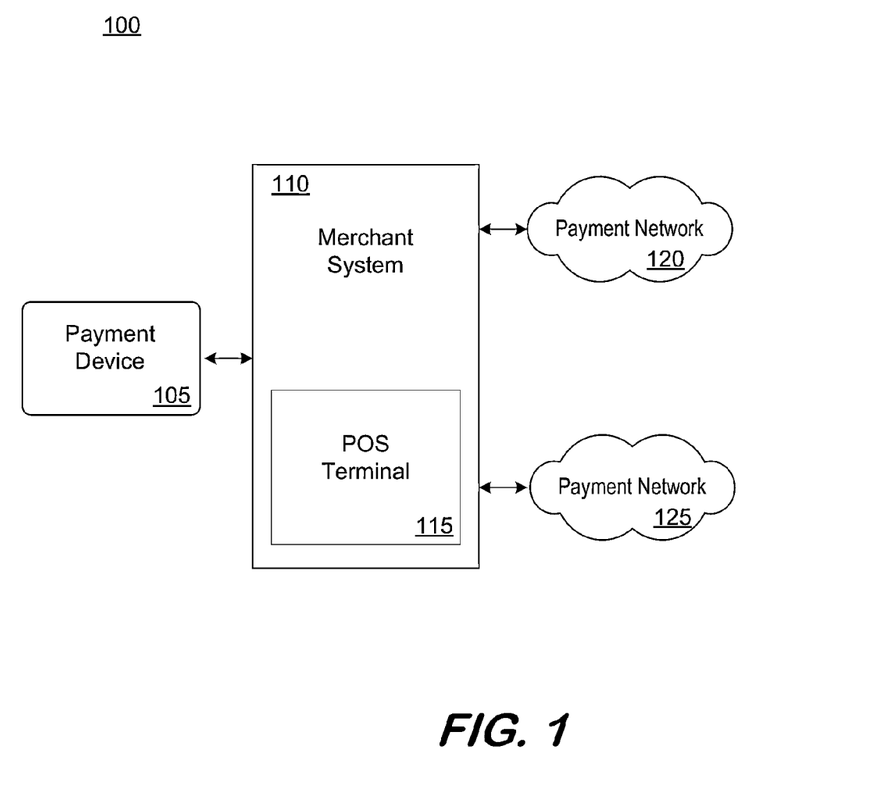
FIG. 1 is a schematic block diagram of a system pursuant to some embodiments herein.

Referring FIG. 1, a system 100 that may be used to conduct payment transactions is illustrated. System 100 facilitates payment transactions in which a merchant (or an agent of the merchant, such as a merchant acquirer) may select or specify network routing for transactions using or associated with a payment device. As depicted, system 100 includes a payment device 105 interacting with a merchant system 110. Merchant system 110 may include a number of devices and/or (sub) systems, including for example, one or more payment terminals such as point of sale (POS) terminal 115. While merchant system 110 is shown as including only one payment terminal, POS terminal 115, additional POS and other terminals may be included without any loss of generality.

Payment device 105 may be, for example, a payment card having an integrated circuit ("IC") chip thereon and/or in with a processor, a memory, and one or more contact or contactless communication devices, allowing contact or contactless communication with the merchant system 110 in order to conduct a payment transaction. For example, in some embodiments, payment device 105 may be a payment card issued by a financial institution (i.e., the "issuer" of the card) and personalized with payment card data associated with one or more payment accounts and payment applications stored thereon. In some aspects, the IC card is configured to run several M/Chip applications, i.e. they are "combo cards" or "combicards". For example, the payment applications may be configured to comply with one or more standards, such as for example, the EMV interoperable payments specifications promulgated by EMVCo, LLC or the like. In some embodiments, the payment specification may define the behavior of the payment card, the application data and storage, and the behavior of the point of sale terminals with which the payment card interacts. Those skilled in the art, upon reading this disclosure, will appreciate that any of a number of different payment specifications or schemes may use one or more features of the present disclosure, whether alone or in combination, with desirable results.

Further, although a payment card is depicted as the payment device 110 in FIG. 1, some embodiments may be used in conjunction with other payment device form factors, including, for example, other physical and/or virtual (e.g., electronic, online, etc.) embodiments such as mobile telephones configured with payment applications stored thereon.

As further shown in FIG. 1, merchant system 110 is in communication with one or more payment networks 120, 125. A merchant that uses features of the present disclosure may have processing relationships with more than one payment network, allowing the merchant to route different transactions over different payment networks for processing of a payment transaction. As used herein, the term "payment network" refers to a payment processing network such as the BANKNET® network operated by MasterCard International Incorporated, the VISANET® network operated by Visa International Service Association, or similar networks such as the STAR® network operated by First Data Corporation. Embodiments allow merchants to select which payment network 120, 125 to route a transaction over based on information obtained from the payment device 105 at a POS device operated by the merchant. In some current contexts, merchants have little control over the routing such transactions, and more particularly, due to a lack of information obtained from the card they do not have an ability to determine the desired payment network and/or select the appropriate set of card data at the payment terminal.

Figure 2:
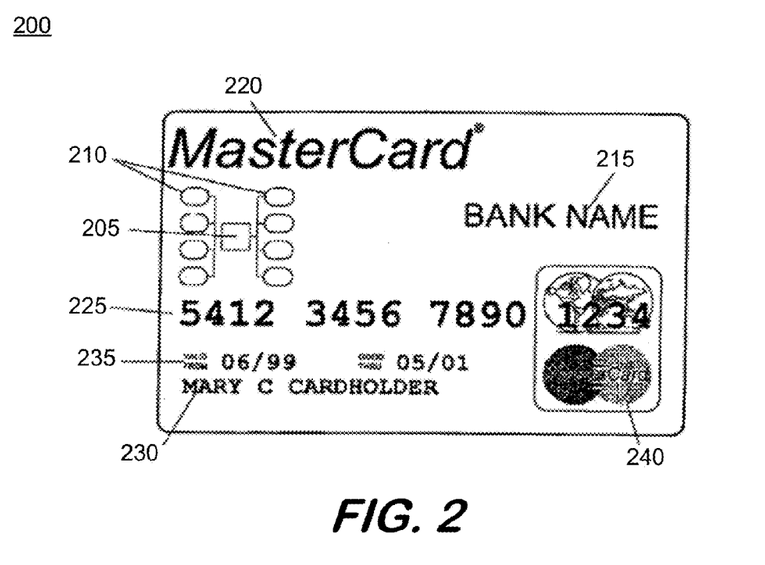
FIG. 2 is an illustrative depiction of a payment device, according to some embodiments herein.

FIG. 2 is an illustrative depiction of one type of payment device such as an IC card device 200. The transaction card 200 shown in FIG. 2 incorporates integrated circuit technology into a conventional-like credit card. The transaction card 200 looks similar to a conventional credit card, but also includes an integrated circuit ("IC") 205 that includes a microprocessor, and electrical contacts 210 for communications between IC 205 and devices external to transaction card 200. Transaction card 200 may be used as a cash card, a credit card and/or a debit card or for other applications. Similar to a conventional credit card, the front side of transaction card 200 may contain the name 215 of a financial institution that issues the card and/or the name 220 of a payment system (e.g. MasterCard®) under whose authority the card is issued, a cardholder's account number 225, the cardholder's name 230, dates 235 between which the card is valid and usable, and a logo or brand 240 associated with the payment system.

In an alternate embodiment, the transaction card 200 may be replaced by any integrated circuit device. The integrated circuit device may have a form factor different than that of the transaction card 200, including, for example, a mini-card, a key fob, a contactless IC card, and the like. The integrated circuit device includes IC 205, which may not be visible. The integrated circuit device may utilize electrical contacts 210 for communications between the IC 205 and devices external to the integrated circuit device. Alternatively, the integrated circuit device may utilize different modes of communication with external devices including radio frequency communication and induction field communication.

In an embodiment, the transaction card 200 may be embodied as or replaced by a mobile wireless device such as a mobile phone, smartphone, a processor-based tablet computing device, a portable multimedia entertainment device, etc. that contains an integrated circuit device.

Figure 3:
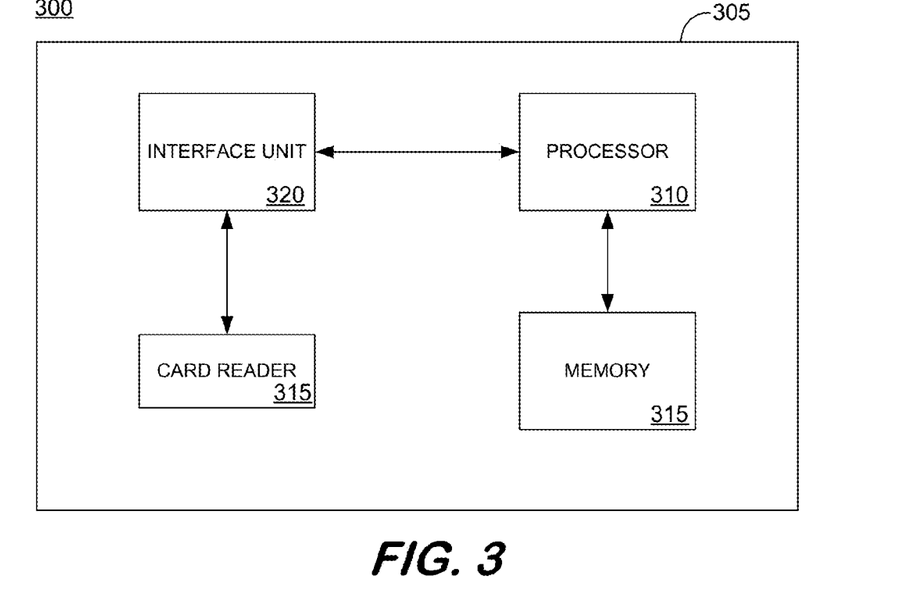
FIG. 3 is an illustrative depiction of a payment terminal, according to some embodiments herein.

FIG. 3 is a block diagram of a system 300 for reading information from and writing information to a payment device such as, for example, an IC card device. System 300 includes a terminal or payment terminal 305. The term "terminal" or "payment terminal" herein generically describes devices with which the payment device such as an IC card device may communicate. Some embodiments of a payment terminal may include a kiosk-type interface terminal, a personal computer, POS terminal, an ATM, a mobile phone, a portable computing device such as a tablet, etc.

Terminal 305 includes a processor 310 connected to a memory 315 and an interface unit 320. Processor 310 processes, controls, and outputs data to interact with a user via interface unit 320. Processor 310 communicates with and controls memory 315 that stores executable program instructions or code such as the options presented to and selectable by a cardholder during a payment transaction session, as well as program instructions to execute processes and methods disclosed herein. In some embodiments, the cardholder may optionally enter various data and information, such as the cardholder's personal identification information (e.g., a PIN), as well as static information such as a transaction history via the interface unit 320. Interface unit 320 may include a combination of hardware and software, including a display screen, designed to communicate with a cardholder, and buttons, keypads, keyboards or other user interface devices/systems with which a cardholder may input data to the terminal and receive output(s) from the terminal. Interface unit 320 may also include a card reader 325 to which the cardholder inserts or presents a payment device in order to exchange data with the payment terminal.

Processor 310 may operate to communicate with interface unit 320 and process the commands and data provided to the terminal by the payment device and/or the cardholder. Processor 310 may also communicate with devices and systems such as, for example, a payment network (not shown in FIG. 3). This communication may be accomplished, for example, using standard short-distance and long-distance communication networks such as local-area and wide-area networks, via telephone-based or wireless communication lines or dedicated transmission lines, and other communication channels using any number and variety of communication protocols that are now known or that become known in the future.

In some embodiments, processor 310 may communicate with devices external to terminal 305 such as credit or debit card payment processing networks (not shown), to which credit, debit or pre-authorized amount card information can be sent and verification for the purchase can be received.

Pursuant to some embodiments, features of the present disclosure may be used to comply with regulatory requirements such as some debit regulations in the United States that specify that certain types of debit card account transactions be routable over more than one (e.g., at least two) payment network (i.e., non-exclusive payment network routing). In the following, an example of coding and processing that supports such an environment will be disclosed. Those skilled in the art, upon reading this disclosure, will appreciate that similar features may be used with desirable results in other environments where it is desirable to provide merchant choice in network routing. Such other environments may include, for example, other jurisdictions, countries, and locales other than the United States and/or other governing entities other than the United States and/or other payment transactions involving non-exclusive payment network routing.

In an illustrative example, payment device 105 is an EMV compatible payment device, as is the POS terminal 115 at which the payment device is presented for use. Payment device 105 is configured such that certain payment types, including for example debit payment types, are personalized or updated to include an additional data object in the payment application for each payment account on the device 105. This additional data object is referred to herein as an "Application Regulations" data object. The "Application Regulations" data object may be included in the ADF (Application Data File) Directory Entry, in the FCI (File Control Information) of the ADF, and in the Directory Entry of the PPSE (Proximity Payment Systems Environment) for contactless.

In some embodiments, the "Application Regulations" data object of a payment application may be updated in accordance with a process to efficiently and effectively update payment application associated data at a terminal (e.g., a POS terminal, an ATM, etc.). Aspects of updating payment application associated data at a terminal will be discussed in greater detail hereinbelow.

In an illustrative example that follows, several assumptions are made for the sake of clarity. First, in the following example, there are no unique application identifiers ("AID(s)") for the point of sale terminals or ADF Names for the payment devices assigned for the US Debit applications. The same AID/ADF Name may be used for a U.S. Debit product but also for an international product (e.g. the MasterCard AID 'A0 00 00 00 04 10 10' can be used for a MasterCard U.S. Debit application).

Second, in the following example, certain payment devices may function as "combo cards". As used herein, a "combo card" refers to a payment device that may have multiple payment applications thereon or associated therewith, including multiple payment applications of the same product type— such as two or more U.S. debit applications that are linked to different payment accounts. For example, a single card payment device may contain a first U.S. debit application linked to a personal account and a second U.S. debit application linked to a professional or business account. In the U.S. regulatory environment briefly described above requiring non-exclusive routing for a U.S. debit application, each of the U.S. debit applications may have two instances. In the illustrative example, where the payment device has a first U.S. debit application linked to a personal account and a second U.S. debit application linked to a business account, the payment device will have at least four (4) ADF Names (e.g., two (2) payment routing networks for each of the two (2) applications).

As an example, a MasterCard debit product (e.g., a first U.S. debit application) combined with a local debit product (e.g., a second U.S. debit application) on a same payment device, may have the following four (4) ADF Names included on the payment device:

(1) 'A000000099222201' (Local Debit) and (2) 'A000000004101001' (MasterCard Debit) linked to personal account; and (3) 'A000000099222202' (Local Debit) and (4) 'A000000004101002' (MasterCard Debit) linked to professional account.

Pursuant to some embodiments, including situations where the payment device functions as a combo card with multiple products thereon, the cardholder is provided an opportunity to select which account (e.g., personal debit or business debit) to use in a transaction. Some embodiments herein further allow the merchant to automatically select the network routing to use for the cardholder selected account (e.g., in the present example, the merchant may automatically select to route the transaction over the MasterCard network or over some other network, such as the STAR® network).

As an illustrative, though not limiting example, the "Application Regulations" data object for the payment device may be (en)coded as follows:
Name: Application Regulations
Format: n
Template: 'BF0C' or '73' (for contact)
'61' (for contactless)
Tag: '9E'
Length: var.

The "Application Regulations" data object lists the regulations the application is subject to and may be (en)coded in accordance with the following format:
Format:

| Bytes | Data Field |
|---|---|
| 2-1 | Country Code according to [ISO 3166-1] |
| 4-3 | Product class:<br>'0001': application subject to Durbin regulation<br>other values: RFU |
| 5 | Product instance (in some embodiments, a diversifier may be used when the list of applications on the cardholder device is dynamic e.g. for mobile—so that values assigned by different banks do not end up being the same) |
| 7-6 | '0000', all other values RFU |
| var-8. | Alternative Name |

For the combo card of the present example including the personal account and the professional account and the other assumptions introduced above, the following Application Regulations may be assigned to each of the ADF Names:

(1) Personal local debit:
ADF Name: 'A000000099222201'
Application Regulations: '08 40 00 01 01 00 00 50 65 72 73 6F 6E 61 6C 20 44 65 62 69 74' ("Personal Debit")

(2) Personal MasterCard debit:
ADF Name: 'A000000004101001'
Application Regulations: '08 40 00 01 01 00 00 50 65 72 73 6F 6E 61 6C 20 44 65 62 69 74' ("Personal Debit")

(3) Professional local debit:
ADF Name: 'A000000099222202
Application Regulations: '08 40 00 01 02 00 00 50 72 6F 66 65 73 73 69 6F 6E 61 6C 20 44 65 62 69 74' ("Professional Debit")

(4) Professional MasterCard debit:
ADF Name: 'A000000004101002'
Application Regulations: '08 40 00 01 02 00 00 50 72 6F 66 65 73 73 69 6F 6E 61 6C 20 44 65 62 69 74' ("Professional Debit")

It is noted from the above that all of the payment applications are coded as belonging to Product class '0001' and ADF names (1) and (2) have the same "product instance" of "01" and ADF names (3) and (4) have the same "product instance" of "02".

For applications subject to the U.S. regulatory requirement(s) described above, the "Application Regulations" data object that denotes whether the application is subject to non-exclusive network routing may be included in the ADF Directory Entry, in the FCI of the ADF and in the Directory Entry of the PPSE for contactless.

Regarding the ADF Directory Entry, the "Applications Regulations" may be included in the ADF Directory Entry as follows:

| Tag | Value | Presence |
|---|---|---|
| '4F' | ADF Name | M |
| '50' | Application Label | M |
| '9F12' | Application Preferred Name | O |
| '87' | Application Priority Indicator | O |
| '73' | Directory Discretionary Template | O |
| '9E' | Application Regulations | O |
| 'XXXX' | 1 or more additional proprietary data objects from an application provider, issuer, or IC card supplier, or EMV defined tags that are specifically allocated to template '73'. | O |

Regarding the FCI of the ADF, the "Applications Regulations" may be included in the FCI as follows:

| Tag | Value | Presence |
|---|---|---|
| '6F' | FCI Template | M |
| '84' | DF Name: | M |
| 'A5' | FCI Proprietary Template | M |
| '50' | Application Label | M |
| '87' | Application Priority Indicator | O |
| '9F38' | PDOL | O |
| '5F2D' | Language Preference | O |
| '9F11' | Issuer Code Table Index | O |
| '9F12' | Application Preferred Name | O |
| 'BF0C' | FCI Issuer Discretionary Data | O |
| '9F4D' | Log Entry | O |
| '9E' | Application Regulations | O |
| 'XXXX' | 1 or more additional proprietary data objects from an application provider, issuer, or IC card supplier, or EMV defined tags that are specifically allocated to template 'BF0C'. | O |

Regarding the Directory Entry of the PPSE for contactless payment devices, the "Applications Regulations" may be included in the PPSE as follows:

| Tag | Value | Presence |
| --- | --- | --- |
| '6F' | FCI Template | M |
| '84' | DF Name ("2PAY.SYS.DDF01") | O |
| 'A5' | FCI Proprietary Template | M |
| 'BF0C' | FCI Issuer Discretionary Data | M |
| '61' | Directory Entry | M |
| '4F' | ADF Name | M |
| '50' | Application Label | O |
| '87' | Application Priority Indicator | C |
| '9F2A' | Kernel Identifier | C |
| '9F29' | Extended Selection | C |
| '9E' | Application Regulations | O |
| '61' | Directory Entry | O |
| '4F' | ADF Name | C |
| '50' | Application Label | O |
| '87' | Application Priority Indicator | C |
| '9F2A' | Kernel Identifier | C |
| '9F29' | Extended Selection | C |
| '9E' | Application Regulations | O |
| '61' | ... | |

Payment device 105 configured as described above may be used at payment terminals that are configured to apply merchant-specified network routing preferences to the payment device holder's (e.g., cardholder's) routing selection. An illustrative process 400 for such processing at a payment terminal will now be described with reference to FIG. 4. In the illustrative process 400, the introductory assumptions discussed above relating to a payment device having, for example, two U.S. debit applications will be described. Further, illustrative process 400 will be described with reference to EMV terminology. In the following illustrative process, it will be assumed that U.S. EMV point of sale terminals are configured to generate a Candidate List and perform a Final Selection as specified by the EMV specifications and possibly displaying the Alternative Names instead of the Application Preferred Names or the Application Labels. However, in accordance with some aspects herein, process 400 may perform additional processing on the Candidate List prior to performing the Final Selection for routing. Furthermore, POS terminals in some embodiments herein related to process 400 may maintain a U.S. Debit AID Preference List that is a subset of the list of AIDs supported by the point of sale terminal and represents the AIDs supported by the terminal that are subject to the "routing regulations" and/or merchant preferences. In some aspects, the AIDs included in the U.S. Debit AID Preference List of a terminal are ordered according to, for example, the preferences of the merchant (and/or the merchant acquirer).

Figure 4:
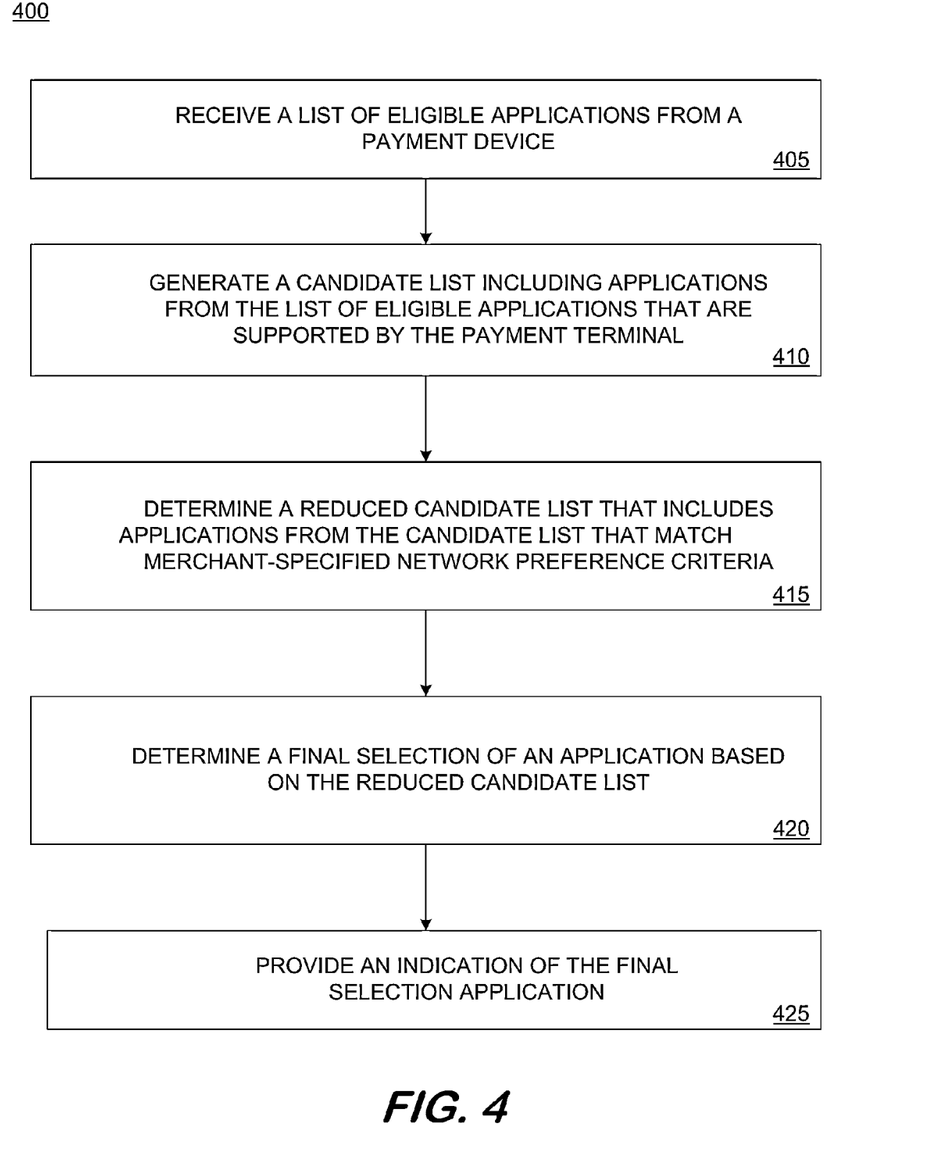
FIG. 4 is a flow diagram of an illustrative process, according to some embodiments herein.

Referring to process 400, a listing of eligible payment applications is received from the payment device 105 by POS (or other type of) terminal 115 at operation 405. The listing of eligible payment applications may include the payment applications supported by and active on the payment device.

At operation 410, the payment terminal generates a Candidate List of payment applications (e.g., via a normal EMV interaction between the payment device and the payment terminal) that includes the applications in the list of eligible payment applications received from payment device 105 that are also supported by POS terminal 115.

Processing continues to operation 415 where the payment terminal processes all of the entries in the Candidate List to create U.S. Debit Candidate List(s) and a Reduced Candidate List. The U.S. Debit Candidate List(s) and a Reduced Candidate List may be generated as follows:

All entries that are labeled as U.S. debit applications and that have the same Product Instance are gathered in a US Debit Candidate List. There will be several US Debit Candidate Lists if there are several Product instances on the card.

All entries not labeled as or otherwise indicated as being a U.S. debit application are copied to the Reduced Candidate List.

Processing continues at 415 where, for all US Debit Candidate Lists, the payment terminal (e.g., 115) verifies whether the first AID in the US Debit AID Preference List maintained by the payment terminal matches any ADF Names in the US Debit Candidate List, where partial matching may be used to determine matches between the ADF Names (en)coded in the US Debit Candidate List and the AIDs (en)coded in the US Debit AID Preference List. If a match is determined, then the payment terminal adds the first matching entry to the Reduced Candidate List. In the instance no match is found, then no entry is added to the Reduced Candidate List and the terminal continues to traverse the US Debit AID Preference List to the next AID therein and compares that next AID with the ADF Names in the US Debit Candidate List.

In this manner, a payment terminal implementing process 400, including operation 415, may efficiently determine the payment network the routing of transactions associated with a payment device based on, for example, an ordered listing of merchant-specified routing preferences. In some embodiments, the ordered listing of merchant-specified routing preferences includes a listing of preferred payment networks to use for routing and processing of U.S. debit applications as specified by the merchant, where the payment networks include a preferred rank, order, or priority. In some embodiments, higher ranked payment networks are preferred over lower ranked payment networks, although an inverse or other ordering scheme may be used. In some embodiments, the merchant may specify a most preferred (i.e., highest ranking) payment network, with or without specifying a rank or order for all of the other payment networks in the ordered listing of merchant-specified routing preferences.

It is noted that while process 200 relates to and considers merchant preference routing, this same and other processes may include, be expanded to include, and be modified to alternatively include additional, fewer, other, and alternative routing processing operations. For example, operation 415 may be expanded, reduced, and modified to alternatively include additional, fewer, other, and alternative considerations and basis for routing payment device transactions.

The Reduced Candidate List of operation 415 may include non-U.S. debit applications and an ordered listing of AIDs based on the merchant's payment network routing preferences.

In some embodiments, process 400 continues to operation 420 where the payment terminal continues with a determination of a Final Selection of a payment application, as described by the EMV specifications. It is noted that the Final Selection payment application determined at operation 420 further includes using the Reduced Candidate List disclosed herein as the basis of selecting the payment application instead of the Candidate List, and possibly displaying the Alternative Names instead of the Application Preferred Names or the Application Labels.

Process 400 continues to operation 425 that provides an indication of the payment application selected in the Final Selection. The indication of the payment application selected in the Final Selection may be embodied in a message, an output file, a script, and other data structures that may be persisted, stored and/or transmitted for further processing. In some aspects, the indication of the payment application selected by the Final Selection operation determination at operation 420 may be used to process a payment transaction associated with the payment device.

A further specific illustrative, but not limiting, example of the process illustrated in FIG. 4 is provided below, where the following list of six (6) AIDs are supported by the payment terminal:

{ 'A0000000031010', 'A00000002501',
'A0000001523010', 'A0000000041010',
'A0000000651010', 'A0000000992222' }.

Additionally, the payment terminal of the present example stores the following US Debit AID Preference List, including three (3) AIDs:

{'A0000000992222', 'A0000000041010', 'A0000000031010'}

In this example, the payment terminal (e.g., POS terminal 115) causes the following Candidate List (e.g., operation 410), as described by EMV regulations, to be generated based on the payment applications on the payment device:

{ { 'A00000004101001', "MasterCard Debit", '01',
'0840000101000004465626974' },
{ 'A0000000410102', "MasterCard Credit", '02' },
{ 'A0000000992222', "Local Debit", '03',
'0840000101000004465626974'
} }

In the above data, the strings represent the following formatted data:

{ ADF Name, Application Label, Application Priority Indicator, [Application Regulations] }.

In this example, processing (e.g., operation 415) of a payment transaction using the payment device with the above-listed payment applications at a payment terminal with the above-listed US Debit AID Preference List proceeds to cause the payment terminal to generate one US Debit Candidate List (for the Product instance '01' of the two (2) debit applications) as follows:

{ { 'A00000004101001', "MasterCard Debit", '01',
'0840000101000004465626974'},
{ 'A0000000992222', "Local Debit", '03',
'0840000101000004465626974' }
}.

And, the (partial/preliminary) Reduced Candidate List as follows:

{{'A0000000410102', "MasterCard Credit", '02'}}.

Processing continues as the payment terminal is caused to select and determine the entry from the US Debit Candidate List matching the first entry from the (preference ordered) US Debit AID Preference List, i.e., {{'A0000000992222', "Local Debit", '03', '0840000101000004465626974'}} and add it to the Reduced Candidate List to get the following Reduced Candidate List:

{{'A0000000410102', "MasterCard Credit", '02' }
{ 'A0000000992222', "Local Debit", '03',
'0840000101000004465626974'}}

A Final Selection is performed by the payment terminal (e.g., operation 420), as described in the EMV specifications, using the determined Reduced Candidate List instead of the Candidate List and possibly displaying the Alternative Names instead of the Application Preferred Names or the Application Labels. Accordingly, the payment transaction may be automatically routed over the payment network desired by the merchant using the Reduced Candidate List that includes the merchant preferred payment networks, including the order of the merchant's preference.

It is noted that similar processing may be performed at other types of transaction terminals, including, for example, Automated Teller Machines ("ATMs"), transit kiosks, etc. In some embodiments, a U.S. EMV ATM terminal may perform application selection as specified by EMV (EMV Book 1 for contact and EMV Book B for contactless), but further perform additional processing on the Candidate List after building the Candidate List as described in section 12.3 of EMV Book 1 for contact and in section 3.3.2 of EMV Book B for contactless. The additional processing may facilitate the payment terminal selecting a payment network for routing with the highest priority, as defined by EMV.

Pursuant to some embodiments, the additional processing to provide a payment terminal with a functionality to select a payment network for routing transactions associated with a payment application with the highest priority may include, in full or part, aspects discussed below and illustrated in FIG. 5, process 500. In some aspects, process 500 may be similar to process 400.

At operation 505, a listing of eligible payment applications is received from the payment device by a ATM of sale (or other type of) terminal. The listing of eligible payment applications may include the payment applications supported by and active on the payment device.

At operation 510, the payment terminal may generate a Candidate List of payment applications based on the list of eligible payment applications received from the payment device 105 (e.g., via a normal EMV interaction between the payment device 105 and the payment terminal) that are also supported by the payment terminal.

Process 500 proceeds to operation 515 where the payment terminal processes all of the entries in the Candidate List to generate U.S. Debit Candidate List(s) and a Reduced Candidate List. All of the entries in the Candidate List that are labeled or otherwise indicated as being a U.S. debit application (i.e., subject to non-exclusive payment network routing) and having the same Product instance are placed in a U.S. Debit Candidate List. There may be several US Debit Candidate Lists if there are several Product Instances of the payment applications included in the Candidate List. In the instance it is determined that a particular payment application is a U.S. debit application at operation 515, then that particular payment application (or an indication thereof) is added to a U.S. Debit Candidate List.

In the instance it is determined that a particular payment application in the Candidate List is not a U.S. debit application, then that particular payment application (or an indication thereof) is added to a Reduced Candidate List. In some embodiments, all entries not labeled or indicated as being a U.S. debit application are included in the Reduced Candidate List.

Processing continues to operation 520 where, for all entries on the US Debit Candidate List(s), the payment terminal determines the application entry with the highest priority, as defined by EMV, and adds it to the Reduced Candidate List.

In some embodiments, process 500 continues to operation 525 where the payment terminal continues with a determination of a Final Selection of a payment application, as described by the EMV specifications. It is noted that the Final Selection payment application determined at operation 525 further includes using the Reduced Candidate List of operation 515 and the highest priority indicator determined at operation 520 as the basis for selecting the payment application instead of the Candidate List, and possibly displaying the Alternative Names instead of the Application Preferred Names or the Application Labels.

Process 500 continues at operation 530 where an indication of the payment application selected in the Final Selection of operation 525 is provided. The indication of the payment application determined at operation 525 may be embodied in a message, an output file, a script, and other data structures that may be persisted, stored and/or transmitted for further processing. In some aspects, the indication of the payment application selected by the Final Selection operation determination at operation 525 may be used to process a payment transaction associated with the payment device.

Figure 5:
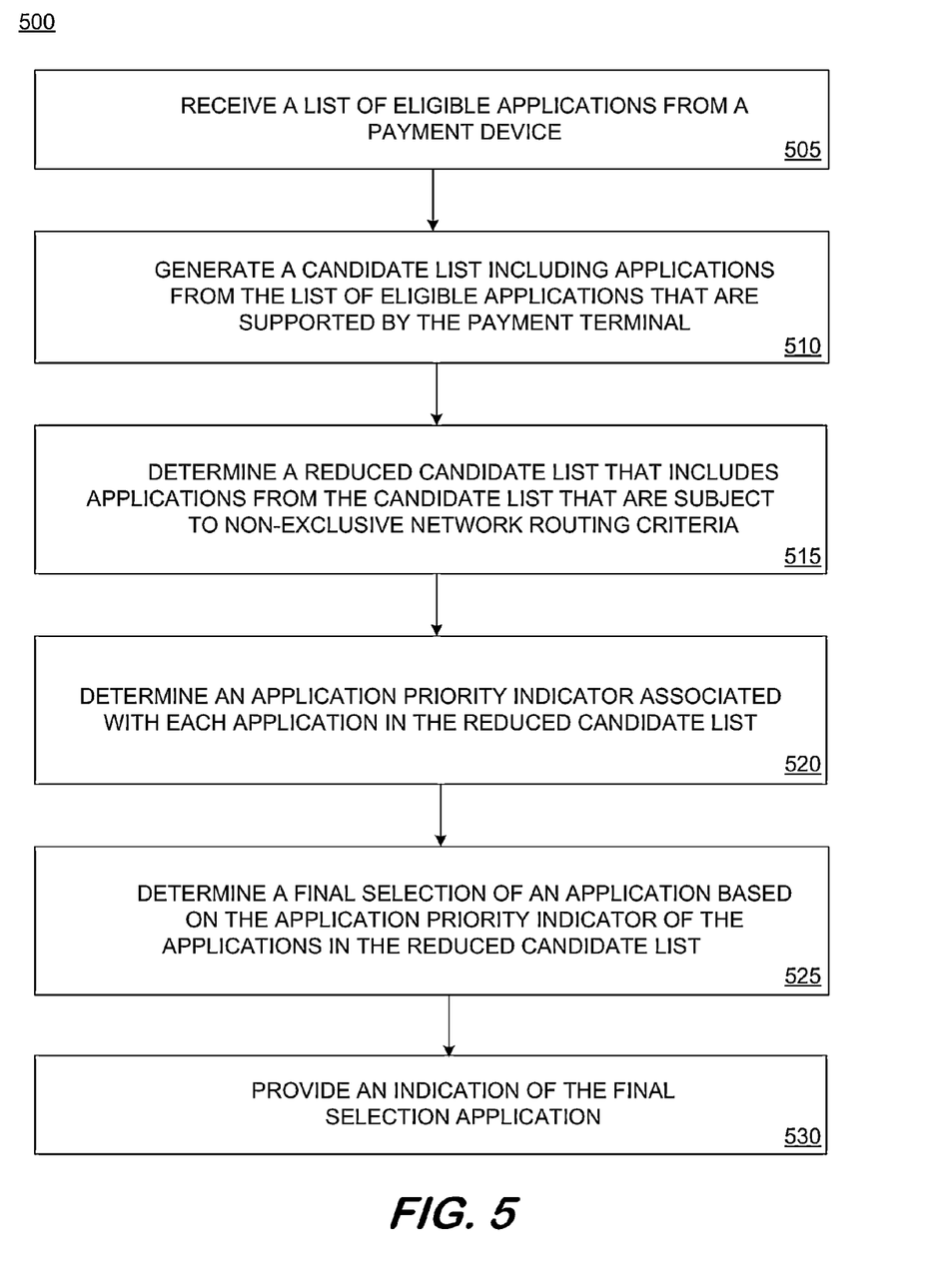
FIG. 5 is a flow diagram of another illustrative process, according to some embodiments herein.

A further specific but not limiting illustrative example of the process 500 depicted in FIG. 5, is provided below, where the following list of six (6) AIDs is supported by an ATM:

{ 'A0000000031010', 'A00000002501', 'A0000001523010', 'A0000000041010', 'A0000000651010', 'A0000000992222' }.

Processing as illustrated in FIG. 5 includes the ATM generating a Candidate List (operation 510) as described by EMV, such that the Candidate List includes the following applications:

{{ 'A0000004101001', "MasterCard Debit", '01', '084000010100004465626974' },
{ 'A0000004101002', "MasterCard Credit", '02' },
{ 'A0000000992222', "Local Debit", '03', '084000010100004465626974' }
.} where the fields in the above strings are defined as follows:

{ ADF Name, Application Label, Application Priority Indicator, [Application Regulations] }.

Processing may continue to where the ATM generates one US Debit Candidate List (for Product instance '01') that includes the following two (2) payment applications:

{ { 'A0000004101001', "MasterCard Debit", '01', '084000010100004465626974' }; and
{ 'A0000000992222', "Local Debit", '03', '084000010100004465626974' }
.} and the following Reduced Candidate List (operation 515):
{{'A0000004101002', "MasterCard Credit", '02'}}.

In agreement with process 500, the ATM then selects (operation 520) the entry from the Reduced Candidate List with the highest priority from US Debit Candidate List, namely application:

{ { 'A0000004101001', "MasterCard Debit", '01', '084000010100004465626974' }.} and adds it to the Reduced Candidate List to get the following two (2) entries:

{{ 'A0000004101001', "MasterCard Debit", '01', '084000010100004465626974' },
{ 'A0000004101002', "MasterCard Credit", '02' } }.

The ATM is then operated to perform a Final Selection (operation 525), as described by the EMV specifications, using the Reduced Candidate List instead of the Candidate List and possibly displaying the Alternative Names instead of the Application Preferred Names or the Application Labels, and the payment transaction is routed over the payment network desired by the merchant.

Process 500 continues at operation 530 that provides an indication of the payment application selected in the Final Selection. The indication of the payment application selected in the Final Selection may be embodied in a message, an output file, a script, and other data structures that may be persisted, stored and/or transmitted for further processing. In some aspects, the indication of the payment application selected by the Final Selection operation determination at operation 525 may be used to process a payment transaction associated with the payment device.

In some embodiments, the processes disclosed herein facilitate providing merchants with an ability to select a desired/preferred payment network for routing payment transactions and adhering to the proper payment application and payment network standards and regulations, while minimizing or eliminating cardholder confusion and merchant investment in infrastructure changes.

The above description and/or the accompanying drawings are not meant to imply a fixed order or sequence of steps for any process referred to herein; rather any process may be performed in any order that is practicable, including but not limited to simultaneous performance of steps indicated as sequential.

In some embodiments, methods and systems herein may include or provide a mechanism for updating a payment application, including parameters associated with payment application data, at a terminal. In some aspects, an embodiment herein may provide a payment application update mechanism that enables an issuer (or other entity) to update parameters of an application, such as to deblock, block, reblock, activate, and deactivate an application on, for example, an IC card, even dormant applications. In some embodiments, payment application parameters such as, for example, a parameter relating to "Application Regulations" discussed hereinabove may be updated according to methods and processes also disclosed herein.

Figure 6:
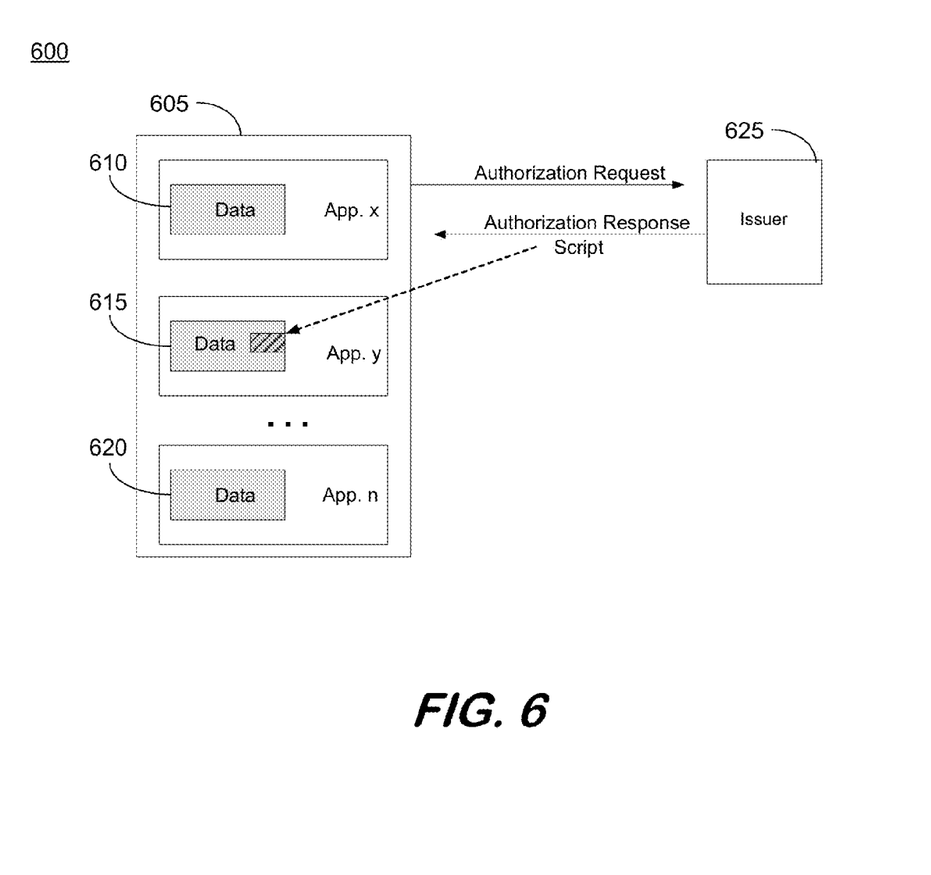
FIG. 6 is an illustrative depiction of a system for updating a parameter of a payment device, according to some embodiments herein.

Referring to FIG. 6, provided is a system or use-case environment that includes a combo card 605 having multiple payment applications 610, 615, and 620 thereon that are issued by Issuer 625. Some embodiments herein provide that when a transaction is conducted online to the Issuer 610 via a primary application "x" (610), the issuer updates, e.g. with a script in a response from the issuer such as an authorization response, parameters of another application "y" (615). By example, such an update of parameters can be for the unblocking, blocking, deblocking, setting, resetting, activating, and deactivating of the application "y" or aspects, parameters, and functionality of application "y".

In general, there may be a strict firewalling between applications "x" and "y" and it may not be possible and/or permissible to modify parameters of application "y" when application "x" is active. Furthermore, in some implementations secured updates of application "y" may require, in order to compute a MAC (message authorization code) on the script command processed by application "y", the knowledge of application "y" originated data (e.g. an Application Cryptogram). The EMV flow does not allow the communication of application "y" originated data when a transaction is conducted with application "x". As a consequence, it is generally not possible to update an application parameter when a transaction is conducted with another application on a standard terminal.

It is noted that before application of some of the methods of the present disclosure are invoked, the IC cardholder may obtain the necessary rights and privileges from the Issuer to be able to use the primary and secondary applications on the payment device (e.g., an IC card). For example, the Issuer may maintain a database that records bibliographic data with respect to each user as well as personal indicators such as PIN codes or biometric data (e.g., an iris scan, fingerprint, etc.). In addition, the rights and privileges of each user are recorded by the Issuer. For example, the database may include information as to whether a specific application for the IC card device is available to the user or whether it is blocked. The user may change the parameters recorded in the database by any suitable method, e.g. by making a request by telephone, by a Short Message Service, by email, by filling in a form on a web-based application or in person at a financial institution, and any other methods supported by the Issuer.

By virtue of some embodiments herein, it is possible to address a script command to application "x" (the application receiving the communication from the Issuer or the "receiving application") from the Issuer via the network and a terminal, wherein the script will, eventually, operate to cause an updating of parameters of application "y" (i.e., the application to be updated or the "target application"). In some embodiments, the security of the script command can be ensured by the receiving application without any loss of security as:

1. The protection of script commands uses identical cryptographic mechanisms for both applications. However, the same keys need not be used.
2. The same issuer is controlling both applications.

The present disclosure may include an optional limitation on any method, system or IC card device herein, that the updating of a second application (or further applications) when a first application is active is limited to the situation where the same Issuer is controlling each and/or every application. In some aspects, the present disclosure further includes an optional limitation that a second application (e.g., application "y" in FIG. 6) cannot be active when a first application is active.

In general, embodiments provide a single payment card with multiple payment applications stored on an IC chip. In the following description, a specific IC card, configured pursuant to the EMV standards (and further pursuant to MasterCard's M/Chip4 specifications) is described including several data elements, and commands that may be used to allow applications to be modified on the IC card. The following illustrative embodiment(s) allow the cardholder to select their preferred payment option in different environments, including, for example, at EMV compatible POS terminals, at EMV compatible ATM terminals, or in online transactions (e.g., via MasterCard SecureCode or based on a distinct primary account number associated with the card). The ability to activate or enable different applications at various types of terminals, including non-dedicated terminals, provides cardholders with more choice, convenience, and flexibility, as well as providing a more efficient interactive process.

Figure 7:
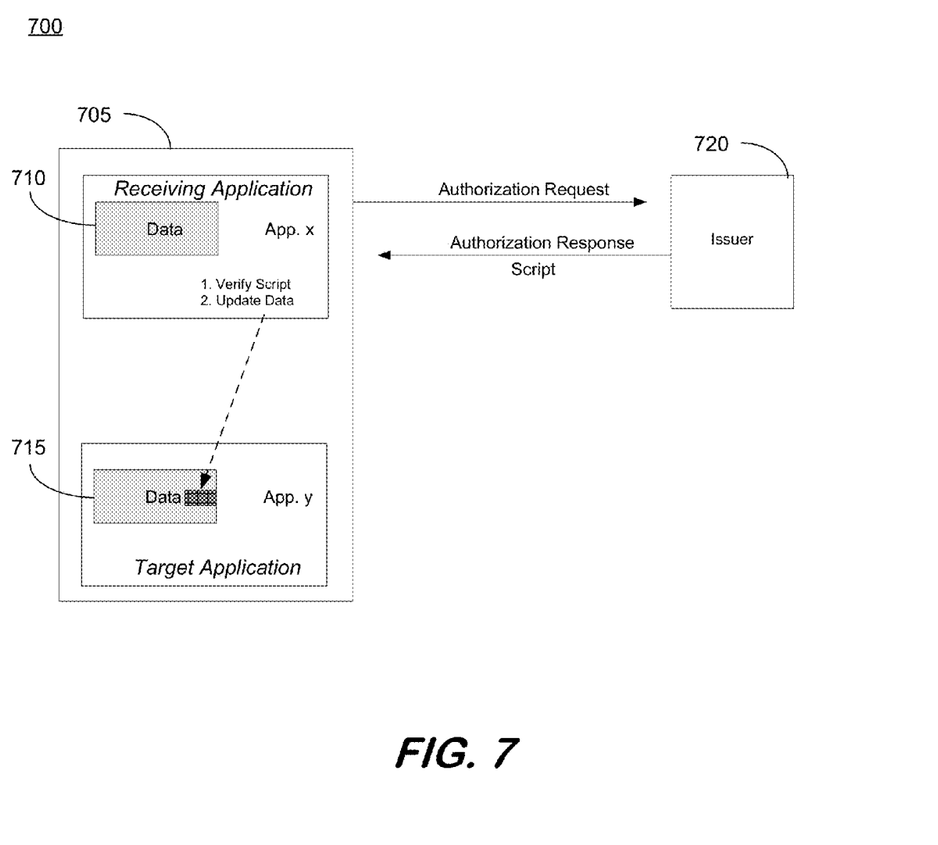
FIG. 7 is a yet another illustrative diagram of a system for updating a parameter of a payment device, according to some embodiments herein.

Referring now to FIG. 7, system 700 is an illustrative depiction of an embodiment of the present disclosure that uses a script command for inter-application communication on an IC card device 705 including applications 710, 715. In general, the inter-application communication is an on-card (or on-device) mechanism. To achieve this, a command that is used to store data in a non-volatile memory on the IC card such as a "Put Data" command can be used for a new data element. Pursuant to some embodiments, this data element has the following fields:

Meta Data has the following format:

| Field | Length | Values |
| --- | --- | --- |
| Version Number | 1 | '00' |
| | | Other values RFU. |
| Update Field | Var. | See below. |

The purpose of the meta data is to inform the active, primary application that the data sent with a request from the Issuer 720 is for a secondary inactive application. Hence, an important field of the meta data is the Update Field that controls the updating process.

Embodiments of the present disclosure can include the limitation or constraint that only certain requests sent from the IC card device to the Issuer can be the trigger for the Issuer to send the script to update a parameter of a secondary application on the card. For example, the script may be included in the response from the Issuer regarding a payment transaction authorization request from the IC card device.

For Version Number '00', Update Field has the following format:

| Field | Length | Values |
| --- | --- | --- |
| Target Application | 1 | '00': This Application |
| | | 'yy': Application yy |
| | | 'FF': By AID |
| Length of AID (only present if Target Application = 'FF') | 1 | '05'-'10' |
| AID (only present if Target Application = 'FF') | '05'-'10' | AID of Target Application |
| Target Data ID | 2 | ID of data to update/process |
| New Value | Var. | Value of data to update/process |

The target application has to be defined, that is, it is required to specify whether the update is for the active primary application (value "00") or for a secondary inactive application on the card. The secondary, inactive application can be defined by any of a variety of methods such as by an index in a table ("yy"), by reference to an Application ID ("FF"), etc. If an Application ID ("AID") is to be used, a separate field can provide the length of the AID. Similarly, the target data (the parameter to be updated), may also be specified by an identification such as the Target Data ID. The value to be updated is specified in the New Value field. This value will be written into the non-volatile memory at the appropriate position. For example, to be able to write a value into a part of the non-volatile memory reserved for the secondary application, the IC card device is adapted for such functionality—for example, the microprocessor and programs, program instructions, or program code running thereon are adapted to share necessary keys between the primary and secondary applications and to be able to access this part of the non-volatile memory. In some instances, a parameter change may not involve a direct communication between two applications. It may, for example, suffice that the active application when presenting a predefined key known to the second application is permitted to change a certain (e.g., a predefined) parameter value that is present in a memory location that can only be accessed by the second application when it is active.

An example of the target data is defined in the next discussed fields. The following Target Data IDs may be supported:

| Target Data ID | Name | Length | Values |
|---|---|---|---|
| '0000' | Block Status | 1 | '00': Unblocked<br>'01': Blocked<br>Other values RFU |
| '00A5' | FCI Proprietary Template | Var. | Any EMV Compliant Value |

As an example, if the Target Data ID field is '00A5', the FCI is to be updated with the New Value provided in the following bytes of the Update Field. This value is shown as "Any EMV Compliant Value". When an update of the FCI data is performed, the FCI of the target application is modified. This data is used by the application for payments, and is just one example of the kind of data that can be updated using embodiments of the present invention. For clarity, "Any EMV Compliant Value" in the table above generally refers to any FCI value allowed by the EMV standards, and the target application will replace the current FCI value with the new value.

As a second example, if the Target Data ID is '0000', then an update of the Block Status is performed and the target application is either "blocked" (if the New Value is '01') or "unblocked" (if the New Value is '00').

The value to be written into the non-volatile memory based on the target data ID and that is associated with the secondary application is a parameter of the secondary application. For example, the parameter value can define that this secondary application is blocked or unblocked. By appropriately setting these values, an application can be unblocked, set, reset, blocked or reblocked.

In some aspects, the user should be able to see any unblocked application when using the card with a terminal. For this purpose, the appropriate display characters are defined as the FCI Proprietary template. These will be displayed (e.g. on an LED or LCD display at the POS or ATM terminal) and means can be provided for the user to select which application he or she wishes to use in a transaction. Such a means can be a keypad, keyboard, touchscreen, and other user interface devices/systems. For example, a card-holder carrying a combo card pursuant to the present disclosure may present the card for use at a POS terminal or ATM terminal to conduct a transaction. Once the card data has been read (for example, pursuant to an EMV compliant interaction between the card and a reader associated with the terminal), a display device at the terminal may offer the cardholder a choice to use any of the unblocked applications on the card (e.g., credit, debit or the like). The cardholder may then interact with the terminal to select which payment application she wishes to use for the transaction. This provides cardholders with an ability to use different payment applications from just a single payment card.

Referring again to the data elements and in particular to the addressing of a target application pursuant to some embodiments, target addressing may be implemented as follows, all of which are embodiments of the present disclosure. An example of how the addressing of the target application can be implemented is as follows. The skilled person in the art will appreciate that this is just one example and various alternatives could be conceived by the skilled person.

Where, Target Application='00' (The primary Application that is active), the target application is the application currently selected.

Where, Target Application='yy' (Application 'yy'), the target application is application 'yy' which is not active, e.g. is a dormant application. This assumes that applications are assigned characters such as alphanumeric characters or numbers known to the Issuer.

Where, Target Application='FF' (By AID), an AID is present in the Update Field. The target application is the application with this AID. In general, a full match is required between the AIDs in order to perform an update.

Pursuant to some embodiments, the "Put Data" command is processed on the Meta Data as follows. The following description relates to commands and data elements associated with MasterCard International's M/Chip4 standard, and are used for illustrative purposes only; those skilled in the art, upon reading this disclosure, will appreciate that similar processing may be performed in other environments to allow the update of applications pursuant to the present invention. In the following, pseudo code is described for processing an update of data to a card which refers to a "PTH" data element such as that used in the M/Chip4 standard. The PTH data element is generally used to store various elements of data (such as information regarding whether an application is blocked, whether a script has previously failed, etc.). Other standards or payment card specifications may provide a similar data storage element. Reference to the "PTH" element is for illustrative purposes only.

In the following pseudo code, several conventions are used (which follow those generally used in M/Chip4 standard), as follows. To refer to a specific byte of a multi-byte data element, a byte index is used under brackets (i.e. "[ ]"). For example, Card Verification Results [4] represents the 4th byte of the Card Verification Results. The first byte of a data element has index 1. To refer to a specific bit of a multi-bit data element, a bit index is used under brackets "[ ]". For example, Previous Transaction History [7] represents the 7th bit of the Previous Transaction History. The first bit of a data element has index 1. To refer to a specific bit of a multi-byte data element, a byte index and a bit index are used under brackets (i.e. [ ] [ ] ). For example, Card Verification Results [2][4] represents the 4th bit of byte 2 of the Card Verification Results.

The pseudo code "SAVE Previous Transaction History [1] ('1b')" means the following occurs "Change the value of the 1st bit of the PTH to 1 (binary), keep the value of the other bits unchanged. Then save this new value of the PTH in non-volatile memory." Note that if PTH[1] was already set to 1 (binary) there is no actual change in the value, but it does not matter here, we want to force the value of the bit after the processing, irrespective of the initial value.

The Target Application is found as described above for Target application addressing. If the Target Application does not exist, 'script failed' is set in PTH of Receiving Application (where the storage element PTH is used to store the outcome of the attempt to update the target application—if the attempt fails, the PTH stores that fact to be communicated to the issuer in a subsequent transaction, for example):

SAVE Previous Transaction History [1]('1b') and reject C-APDU ('6985').

If the Target Application is disabled (Previous Transaction History [6] in Target Application='1b'), 'script failed' is set in PTH of Receiving Application (in general, a "disabled" application is dead, and cannot be unblocked, and this check just confirms—if the application is dead, don't update it):

```
SAVE Previous Transaction History [1]('1b')
   and reject C-APDU ('6985').
If the Target Data ID = '0000' (Block Status)
   If Block Status Value = '00' (Unblocked)
      Unblock Target Application:
      SAVE Previous Transaction History [5]('0b') in Target
      Application (in this step, the PTH is used to store the "blocked"
      /"not blocked" status of the target application).
   If Block Status Value = '01' (Blocked)
      Block Target Application:
      SAVE Previous Transaction History [5]('1b') in Target
      Application.
   If Block Status Value = Other value:
      set 'script failed' in PTH of Receiving Application:
      SAVE Previous Transaction History [1]('1b')
         and reject C-APDU ('6985').
```

If the Target Data ID='00A5' (FCI Proprietary Template) (in this processing step, the FCI of the target application is updated. The mechanism can be used to update many other parameters, however, in this embodiment, the processing is illustrated as only affecting the FCI.)

```
Replace the value field of the FCI Proprietary Template (Tag 'A5') in the
FCI (Tag '6F') of the Target Application with the new value.
Update the length of the FCI Proprietary Template (Tag 'A5') in the FCI
to reflect the replacement.
Update the length of the FCI Template (Tag '6F') to reflect the
replacement.
If error, set 'script failed' in PTH of Receiving Application:
   SAVE Previous Transaction History [1]('1b')
      and reject C-APDU ('6985').
```

Note, only the value of the FCI Proprietary Template is present in subfield New Value (no TLV is present).

From a script processing perspective, only the receiving application on the IC card device has performed the script which sets: (1) the script failed bit in the PTH, (2) the script received bit in the PTH, and (3) the script counter. These items are modified in the receiving application, but not in the target application. In general, a feature of the present invention is to use the tag values as Target Data ID when updating tagged data. For example, if other data is to be updated (e.g., a parameter relating to "Application Regulations"), the Target Data ID (or other specific data fields such as those discussed hereinabove with respect to processes 400 and 500) used would be the identifier already defined (in the specifications defining the application) for the data to be updated.

In some embodiments, a terminal may operate to update a parameter of a payment device independent of a payment transaction. In some aspects, a terminal, such as for example, a POS terminal, an ATM terminal, a payment transaction terminal such as a transit kiosk, etc., may be used to facilitate an interactive process between a user or holder of the payment device and the terminal. In some aspects, the interactive process may not directly involve the user using the payment device to conduct a payment transaction (e.g., using credit, debit, stored value, loyalty program, etc.). As an example, a user may present a payment device to a terminal to receive news, email, and other information where the payment device functions, at least in some regards, as an identity authenticator of the user. In some instances, the payment device may be presented to terminal by the user so that the user may (automatically) log into a social networking account associated with the user. In each of these examples, there may be no need for the payment device and the terminal to exchange information customarily needed to initiate a payment transaction using one or more of the payment applications on the payment device.

Figure 8:
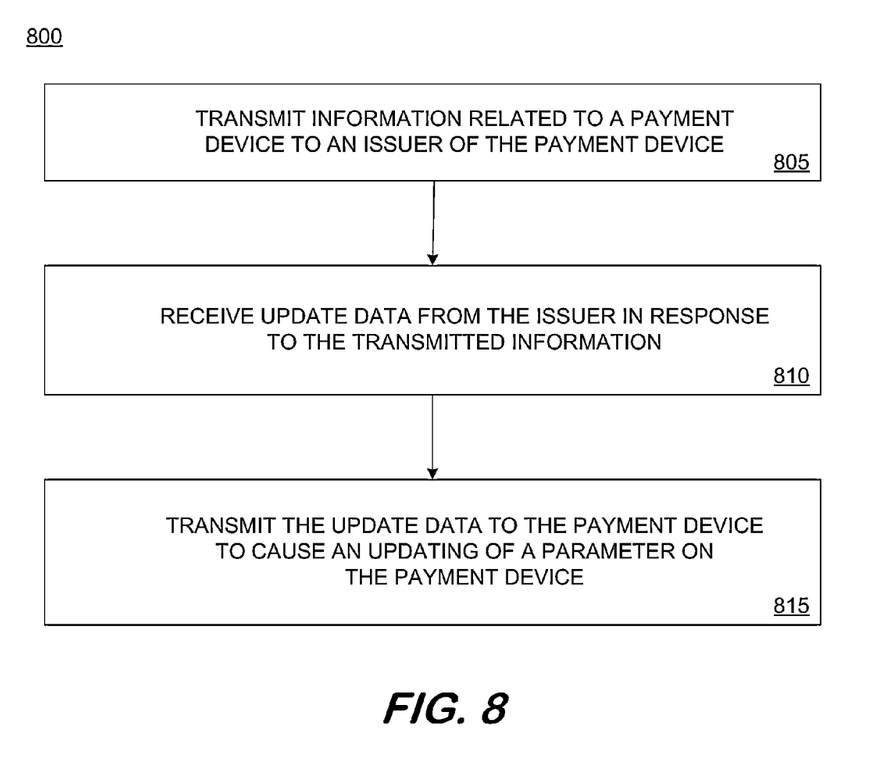
FIG. 8 is a flow diagram of an illustrative process, according to some embodiments herein.

FIG. 8 is an illustrative example of a process 800 for updating a parameter on a payment device by a terminal. At operation 805, information related to a payment device may be transmitted to an Issuer of the payment device. The information transmitted to the Issuer need not include, in some embodiments, data directly related to the one or more payment applications (e.g., AID or ADF) on the payment device since, for example, the terminal may not have received or otherwise be knowledgeable of any of the one or more applications on the payment device. In one aspect, the information transmitted to the Issuer may include an identifier for the Issuer and an identifier for the user of the payment device.

In an example use-case, the payment device user may present the payment device to the terminal to conduct a first, interactive process with the terminal that is not a payment transaction. As such, the payment device may not transmit information directly related to or indentifying one or more of the payment applications thereon to the terminal. In some embodiments, the payment device may transmit information related to a first payment application thereon, but process 800 is invoked for one (or more) of a second payment application for which the payment device and terminal do not interact and exchange information directly related to or is indicative of the second application. As such, the information related to the payment device and transmitted to an Issuer of the payment device at operation 805 may identify the user (or payment device owner/cardholder). In some embodiments, the information transmitted to the Issuer may include information that does identify an application on the payment device.

At operation 810, process 800 includes receiving update data from the issuer in response to, at least in part, the transmitted information. In some embodiments, the data from the Issuer may be supplied to the terminal (automatically, as an option) when the terminal communicates with the Issuer. In some regards, the terminal need not specifically request the update data from the Issuer. The Issuer may, upon its own initiative, provide, supply, or source the update data that is received by the terminal.

In some aspects, the update data may relate to a functionality of the payment device, whether directly related to or associated with one or more of the payment applications on the payment device or not. In some instances, the update data may relate to, for example, a security feature of the payment device, independent of the payment applications thereon. In another example, the update data may relate to a feature or functionality of one of the at least one payment applications on the payment device such as, for example, blocking, deblocking, activating, and deactivating of an application; "Application Regulations" regarding network routing for payment transactions involving the one or more payment applications; and other features/functionality.

At operation 815, update data is transmitted to the payment device to cause an updating of a parameter on the payment device. In some embodiments, and not as a necessity, the parameter may comprise an indicator denoting whether the application is subject to non-exclusive network routing criteria (i.e., "Application Regulations" data object). In some further embodiments, the non-exclusive network routing criteria includes at least one of an industry regulation and a governing entity regulation. Subsequent to operation 815, the payment device may interact with the terminal using a feature and/or functionality updated by process 800.

The above descriptions of processes herein should not be considered to imply a fixed order for performing the process steps. Rather, the process steps may be performed in any order that is practicable, including simultaneous performance of at least some steps. Although embodiments are described with reference to illustrative messages and data elements, other message names, data elements, or the like may be used.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for operating a payment terminal, the method comprising:
   receiving a list of eligible applications from a payment device;
   generating a candidate list, the candidate list including applications from the list of eligible applications received from the payment device that are supported by the payment terminal;
   determining a reduced candidate list, the reduced candidate list including applications from the candidate list that match merchant-specified network preference criteria, the merchant-specified network preference criteria being maintained by the payment terminal;
   determining a final selection of an application based on the reduced candidate list; and
   providing an indication of the final selection application.

2. The method of claim 1, wherein the list of eligible applications comprises sets of card data.

3. The method of claim 1, further comprising using the indication of the final selection application to process a payment transaction associated with the payment device and the payment terminal.

4. The method of claim 1, wherein the determining of the reduced candidate list comprises:
   determining, based on an examination of all of the applications in the candidate list, which applications from the candidate list include an indicator denoting the application is subject to non-exclusive network routing criteria; and
   determining whether the applications from the candidate list including the indicator match the merchant-specified network preference criteria.

5. The method of claim 4, wherein the non-exclusive network routing criteria includes at least one of an industry regulation and a governing entity regulation.

6. The method of claim 1, wherein the merchant-specified network preference criteria comprises an ordered listing indicative of routing preferences of at least one of a merchant and a merchant acquirer.

7. The method of claim 6, wherein the determining of the reduced candidate list is further based on the ordered listing of applications preferred by the at least one of a merchant and a merchant acquirer.

8. The method of claim 1, further comprising transmitting data to the payment device to cause an updating of a parameter associated with at least one of the eligible applications on the payment device.

9. The method of claim 8, wherein the parameter comprises an indicator denoting whether the application is subject to non-exclusive network routing criteria.

10. The method of claim 8, wherein the at least one of the eligible applications is at least one of a dormant application, a blocked application, and an inactive application.

11. A system comprising:
   a payment device reader for reading data from and writing data to a payment device, including receiving a list of eligible applications from the payment device;
   a memory storing executable program instructions; and
   a processor coupled to the memory, the process to execute the executable program instructions to:
   generate a candidate list, the candidate list including applications from the list of eligible applications received from the payment device that are supported by the system;
   determine a reduced candidate list, the reduced candidate list including applications from the candidate list that match merchant-specified network preference criteria, the merchant-specified network preference criteria being stored in the memory;
   determine a final selection of an application based on the reduced candidate list; and
   provide an indication of the final selection application.

12. The system of claim 11, wherein the list of eligible applications comprises sets of card data.

13. The system of claim 11, further comprising the processor using the indication of the final selection application to process a payment transaction associated with the payment device.

14. The system of claim 11, wherein the determining of the reduced candidate list comprises the processor:
   determining, based on an examination of all of the applications in the candidate list, which applications from the candidate list include an indicator denoting the application is subject to non-exclusive network routing criteria; and
   determining whether the applications from the candidate list including the indicator match the merchant-specified network preference criteria.

15. The system of claim 14, wherein the non-exclusive network routing criteria includes at least one of an industry regulation and a governing entity regulation.

16. The system of claim 11, wherein the merchant-specified network preference criteria comprises an ordered listing indicative of routing preferences of at least one of a merchant and a merchant acquirer.

17. The system of claim 16, wherein the determining of the reduced candidate list is further based on the ordered listing of applications preferred by the at least one of a merchant and a merchant acquirer.

18. The system of claim 1, further comprising the payment device reader writing data to the payment device to cause an updating of a parameter associated with at least one of the eligible applications on the payment device.

19. The system of claim 18, wherein the parameter comprises an indicator denoting whether the application is subject to non-exclusive network routing criteria.

20. The system of claim 18, wherein the at least one of the eligible applications is at least one of a dormant application, a blocked application, and an inactive application.

21. A method for operating a terminal, the method comprising:
   transmitting information related to a payment device to an issuer of the payment device, the transmitted information not being indicative of at least one payment application associated with the payment device and at least one payment transaction associated with the payment device;

receiving update data from the issuer in response to, at least in part, the transmitted information;

transmitting the update data to the payment device to cause an updating of a parameter on the payment device.

22. The method of claim 21, wherein the information transmitted to the issuer includes information identifying an application on the payment device.

23. The method of claim 21, wherein the parameter comprises an indicator denoting whether the application is subject to non-exclusive network routing criteria.

24. The method of claim 23, wherein the non-exclusive network routing criteria includes at least one of an industry regulation and a governing entity regulation.

\* \* \* \* \*